United States Patent [19]

Drabarek et al.

[11] Patent Number: 6,100,979
[45] Date of Patent: Aug. 8, 2000

[54] ARRANGEMENT FOR THE TESTING OF SURFACES

[75] Inventors: Pawel Drabarek, Tiefenbronn; Johannes Schwider, Erlangen, both of Germany

[73] Assignee: Robert Bosch GmbH, Stuttgart, Germany

[21] Appl. No.: 08/925,756

[22] Filed: Sep. 9, 1997

Related U.S. Application Data

[63] Continuation-in-part of application No. 08/827,220, Mar. 28, 1997, abandoned.

[30] Foreign Application Priority Data

Sep. 9, 1996 [DE] Germany ............... 196 36 386

[51] Int. Cl.[7] .................................................. G01B 9/02
[52] U.S. Cl. ........................................ 356/356; 356/360
[58] Field of Search .................................. 356/354, 356, 356/359, 360

[56] References Cited

U.S. PATENT DOCUMENTS

| 5,249,032 | 9/1993 | Matsui et al. | 356/356 |
| 5,654,798 | 8/1997 | Bruning | 356/354 |

FOREIGN PATENT DOCUMENTS

| 106 769 C1 | 7/1974 | Germany . |
| 43 17 064 A1 | 11/1994 | Germany . |
| WO91/04460 | 4/1991 | WIPO . |

OTHER PUBLICATIONS

"Grazing Incidence Interferometry Applied to Measurement of Cylindrical Surfaces", in Optical Engineering, vol. 34, No. 12, 3531–3535, 1985.

Primary Examiner—Robert H. Kim
Attorney, Agent, or Firm—Venable; George H. Spencer; Norman N. Kunitz

[57] ABSTRACT

An interferometric measuring arrangement for the testing of surfaces with at least two synthetic holograms, wherein from an incident radiation at least two partial beams are formed of which the one, after diffraction in the first hologram, is reflected at the surface to be tested and is directed at a point of the second hologram upon which the second partial beam impinges directly so that an interference pattern that is characteristic of the surface is formed. With a simple design, it is also possible to test a surface in a blind bore in that the first hologram is configured as a reflection hologram and in that the other partial beam is a beam that is reflected at the reflection hologram with a zero-order diffraction.

11 Claims, 2 Drawing Sheets

ARRANGEMENT FOR THE TESTING OF SURFACES

CROSS-REFERENCE TO RELATED APPLICATION

This application is a continuation-in-part of U.S. patent application Ser. No. 08/827,220, filed Mar. 28, 1997 now abandoned.

This application claims the priority of Patent Application Serial No. 196 36 386.1 filed in Germany on Sep. 9, 1996, the subject matter of which is incorporated herein by reference.

BACKGROUND OF THE INVENTION

The invention relates to an interferometric measuring arrangement for the testing of surfaces with at least two synthetic holograms, wherein from an incident radiation at least two partial beams are formed of which one, after diffraction in the first hologram, is directed at the surface to be measured or tested and is guided in its further course onto a point on the further hologram upon which the other partial beam that is not guided onto the surface to be tested is also impinging, and wherein an interference pattern formed by this superimposition of the two partial beams on the further hologram carries the information regarding the shape of the surface being tested.

An interferometric measuring arrangement of this type is revealed as being known in German Patent DD 106 769 C1. In this known measuring arrangement, synthetic, computer-generated transmission holograms are arranged axially forward of and behind a cylinder-shaped test specimen. A partial beam diffracted by the transmission hologram arranged forward of the test specimen in the direction of the radiation is directed at the curved surface of the test specimen and, from there, at a point of the transmission hologram arranged behind the test specimen in the direction of the radiation. The partial beam which passes through the front transmission hologram without being diffracted also impinges on this point. This creates an interference pattern behind the rear transmission hologram, which interference pattern, for example, has a uniform illumination if the test specimen has the intended shape, whereas the interference pattern deviates from this, if there is a deviation from the shape.

A further interferometric measuring arrangement of this type is also described in an article by Thomas Dresel, Johannes Schwider, Alexander Wehrhahn, and Sergey Babin, entitled "Grazing Incidence Interferometry Applied To Measurement of Cylindrical Surfaces", in Optical Engineering, Vol 34, No. 12, 3531–3535, 1995. These measuring arrangements are suitable for the testing of through-bores.

SUMMARY OF THE INVENTION

It is the object of the invention to make available an interferometric measuring arrangement of the type described at the outset which is also suitable, for example, for measuring blind bores or the like.

The above object generally is achieved according to the present invention by an interferometric measuring arrangement for the testing of a surface utilizing at least first and second synthetic holograms with the first hologram being a reflection hologram, and wherein: at least first and second partial beams are formed from an incident radiation beam, with the first partial beam, after diffraction and reflection in the first hologram, being directed at the surface being tested and then being guided in its further course onto a point of the second hologram upon which the second partial beam, which is not guided onto the surface being tested, is also impinging to cause formation of an interference pattern, which carries the information regarding the shape of the surface being tested, by the superimposition of the two partial beams on the second hologram; and the second partial beam is a beam which is reflected at the first (reflection) hologram with zero-order diffraction.

The reflection hologram can also be accommodated on the inside of a hollow test specimen and is thus suitable, for example, for the examination of blind bores. Here, the surface shape does not have to be that of a cylinder since, by means of the computer-generated holograms, a matching to desired surfaces can take place in that a uniformly illuminated interference pattern is generated for the desired shape, whereas a deviating interference pattern is generated in case of a deviation from the desired shape. The design of the measuring arrangement for this process is simple.

Alternatively, the above object is achieved according to a further embodiment of the invention by an interferometric measuring arrangement for the testing of a surface utilizing at least first and second synthetic holograms with the first hologram being a reflection hologram; and wherein: at least first and second partial beams are formed from an incident radiation beam using a beam splitter disposed in the beam path forward of the first (reflection) hologram, with a portion of the incident radiation passing through the beam splitter as the first partial beam and, after reflection and diffraction in the first hologram, being directed at the surface being tested and then being guided in its further course onto a point on the surface of the second hologram, and with another portion of the incident radiation beam being deflected in the beam splitter and directed, as the second partial beam, via a deflection arrangement, and without being guided onto the surface being tested, onto the point on the surface of the second hologram on which the first partial beam is also impinging to cause formation of an interference pattern, which carries the information regarding the shape of the surface being tested, by the superimposition of the two partial beams on the second hologram; and that portion of the first partial beam reflected at the first (reflection) hologram with zero-order diffraction is prevented from impinging on the second hologram.

With this arrangement, which has a simple design, it is also possible to measure the surface within a blind hole, with only the one partial beam that is used for generating the interference pattern being reflected at the reflection hologram and subsequently at the inside surface of the test specimen, while the other partial beam is guided via a deflection arrangement outside of the test specimen onto the further hologram for generating the interference pattern.

The design according to the first embodiment can be implemented with few optical components in such a manner that a beam splitter is arranged in the beam path forward of the reflection hologram, with the incident radiation passing through the beam splitter in at least a partially linear manner, and that the two partial beams are guided by the beam splitter onto the further hologram embodied as a transmission hologram. Here, an advisable measuring arrangement is designed such that the beam splitter is arranged so that the radiation that is reflected by the reflection hologram in zero-order diffraction is directed at a right angle at the transmission hologram which is arranged to be laterally spaced apart and parallel to the incident radiation. Therefore, the transmission hologram is located laterally outside of the incident radiation and the interference pattern can be analyzed easily.

To simplify the analysis, it is furthermore advisable for the transmission hologram or reflection hologram to be moved in a predetermined manner by a motion device for the analysis by means of phase shift interferometry or heterodyne interferometry. The phase shift interferometry or heterodyne interferometry are known per se; in this context, reference is made, for example, to German Patent publication DE 43 17 064 A1 and European Patent publication EP 491 749 as well as further literature references cited therein. In principle, changes of phase differences are analyzed during this process, with a favorable modulation frequency being selected.

In the second embodiment, an advantageous design is such that the deflection arrangement is realized as a mirror arranged perpendicularly with respect to the other portion of the incident radiation, that the further hologram embodied as a transmission hologram is arranged opposite the mirror on the other side of the beam splitter, and that the other partial beam reflected by the reflection hologram in the zero-order diffraction is preventive from impinging on the other hologram by a half-wave plate/polarizer device arranged between the reflection hologram and the beam splitter. This design comprises only a few optical components and can be adjusted in a relatively simple manner.

An alternative design for the second embodiment provides that the mirror and the transmission hologram are replaced by a second reflection hologram. The second reflection hologram is arranged in place of the mirror. This measure again reduces the number of optical components.

In the second embodiment, a simple, precise analysis by means of phase shift interferometry or heterodyne interferometry is also possible if it is provided that the mirror for the analysis by means of phase shift interferometry or heterodyne interferometry is moved in a predetermined fashion by a motion device in the direction of the normal.

Moving parts are avoided for the analysis by means of the phase shift interferometry or heterodyne interferometry in that the incident radiation is provided with a predetermined frequency shift for the analysis by means of phase shift interferometry or heterodyne interferometry, while utilizing the paths of different lengths of the partial beam reflected at the reflection hologram via the inside surface of the test specimen and of the partial beam guided via the deflection arrangement.

Very precise measurements are possible by means of the above-mentioned measures, such as are required, for example, for units of the diesel injection technique.

BRIEF DESCRIPTION OF THE DRAWING

The above and other features and advantages of the invention will be further understood from the following detailed description of the preferred embodiments with reference to the accompanying drawing figures wherein.

DETAILED DESCRIPTION OF THE PREFERRED EMBODIMENTS

Figure 1:
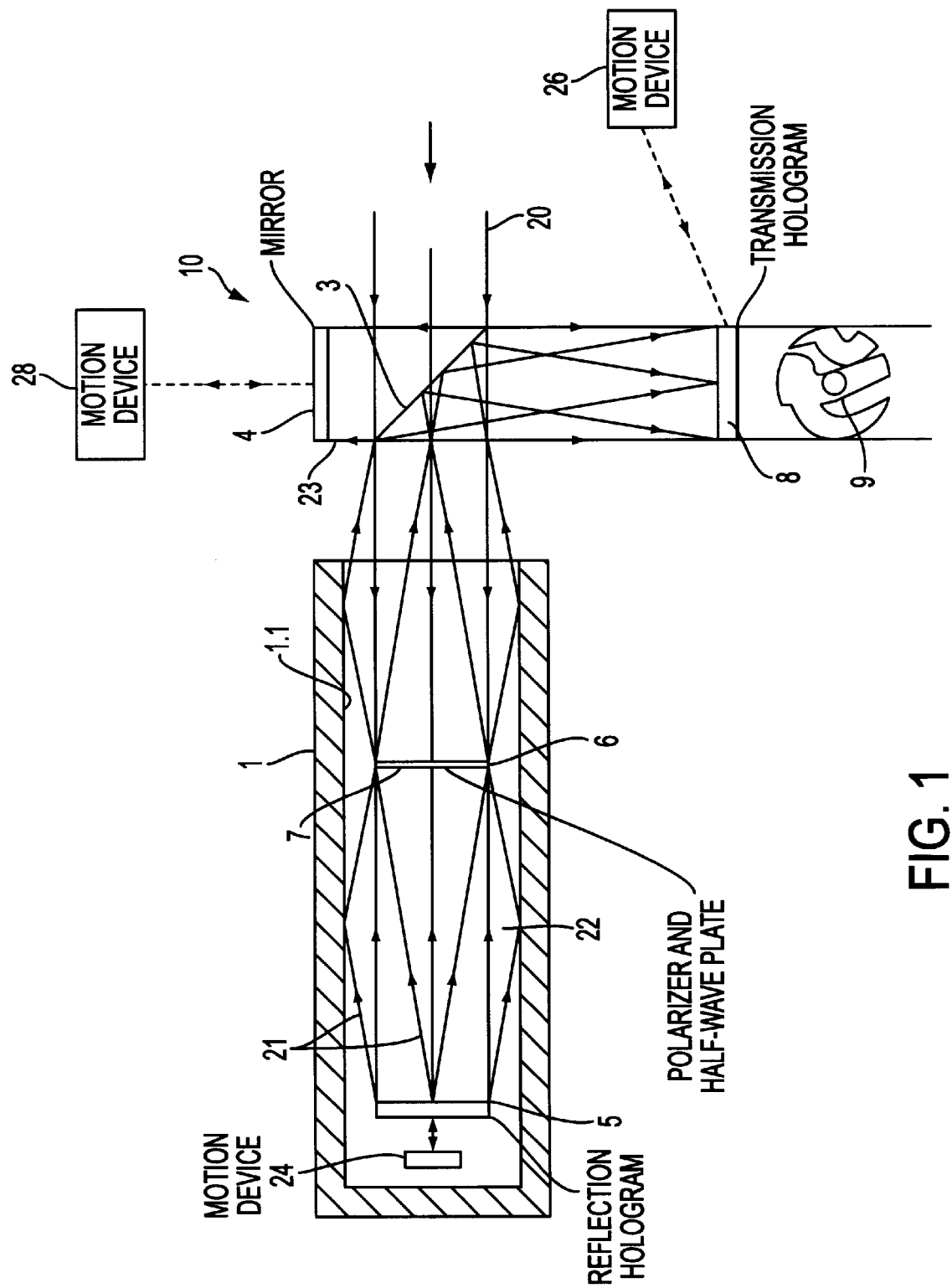
FIG. 1 is a schematic representation of a measuring arrangement according to the invention; and, FIG. 2 is a schematic representation of a further embodiment of a measuring arrangement according to the invention.

FIG. 1 shows an interferometric measuring arrangement 10. It is provided with a reflection hologram 5 which is disposed in a blind bore of a test specimen 1 perpendicularly to the axis of the test specimen, as well as with a transmission hologram 8 arranged laterally of a beam of incident radiation 20. Forward of the test specimen 1, a beam splitter 3 is also arranged onto which the incident radiation 20 provided, for example, by a suitable laser, impinges. A mirror 4 is arranged on the side of the beam splitter 3 opposite the transmission hologram 8. In the blind bore of the test specimen 1, a blocking device, including a polarizer 6 and a half-wave plate 7, for blocking impinging radiation reflected from the reflection hologram 5, is arranged between the access opening of the blind bore and the reflection hologram 5. When necessary, the blocking device blocks a partial beam 22 reflected by the reflection hologram 5 with zero-order diffraction.

A first embodiment of the invention does not utilize the blocking device, including the polarizer 6 and the half-wave plate 7, or the mirror 4. According to this first embodiment, the incident radiation 20 passes through the beam splitter 3 in a substantially linear manner into the blind bore and impinges on the reflection hologram 5. On the hologram 5, two partial beams 21 and 22 are formed, with the one partial beam 21, for example, being the one reflected with the first-order diffraction and the other partial beam 22 being the one reflected with the zero-order diffraction. The one partial beam 21 impinges on the inside surface 1.1 of the test specimen 1 at a flat or shallow angle, with the angle of incidence being so flat that the peak-to-valley depths, which in metals are usually considerably larger as opposed to the wavelength, do not have a disturbing effect. The one partial beam 21 is reflected at the inside surface 1.1 and is subsequently directed at the transmission hologram 8 by the beam splitter 3. The other partial beam 22 reflected with zero-order diffraction reaches the beam splitter 3 directly, i.e., without reflection at the surface of the test specimen 1, and is also directed at the transmission hologram 8. The super position and passing of the two partial beams 21 and 22 through the transmission hologram 8 results in an interference pattern, which carries the information of the tested inside surface 1.1, being produced. The reflection hologram (grating) 5 and the transmission hologram 8 are made synthetically, for example, by use of a computer and are matched to the shape of the surface 1.1 to be measured so that, as a desired state, a uniform illumination of the interference pattern 9 occurs if the surface 1.1 is free from defects, whereas, if the shape of surface 1.1 deviates due to defects, marked light density structures or streaks can be recognized which point to a deviation in shape.

A further or alternative embodiment of the measuring arrangement according to the invention comprises the blocking device having the half-wave plate 7 and the polarizer 6 as well as the mirror 4, all as shown in the Figure. According to this embodiment, a portion of the incident radiation 20 also passes through the beam splitter 3 and is directed at the reflection hologram 5. However, a portion 23 of the incident radiation is guided at a right angle to the direction of the incident light 20 onto the mirror 4 and from there is reflected so that it passes through the beam splitter 3 and impinges on the transmission hologram (grating) 8 arranged on the other side of the beam splitter 3. The portion of the incident radiation 20 admitted or passing directly through the beam splitter 3 falls into the blind bore and reaches the reflection hologram 5 via the polarizer 6 and the half-wave plate 7. The partial beam 21 diffracted at the reflection hologram 5 with the first-order diffraction is reflected at the inside surface 1.1 of the test specimen 1 and deflected at the beam splitter 3 onto the transmission hologram 8 where it superimposes itself over the other portion 23 of the incident radiation so that an interference pattern 9 also results here which indicates any deviation from a desired shape of the surface being tested. The partial beam 22 reflected by the reflection hologram 5 with zero-order diffraction is prevented from impinging on the transmission hologram 8 via the beam splitter 3 by the blocking device having the half-wave plate 7 and the polarizer 6.

Figure 2:
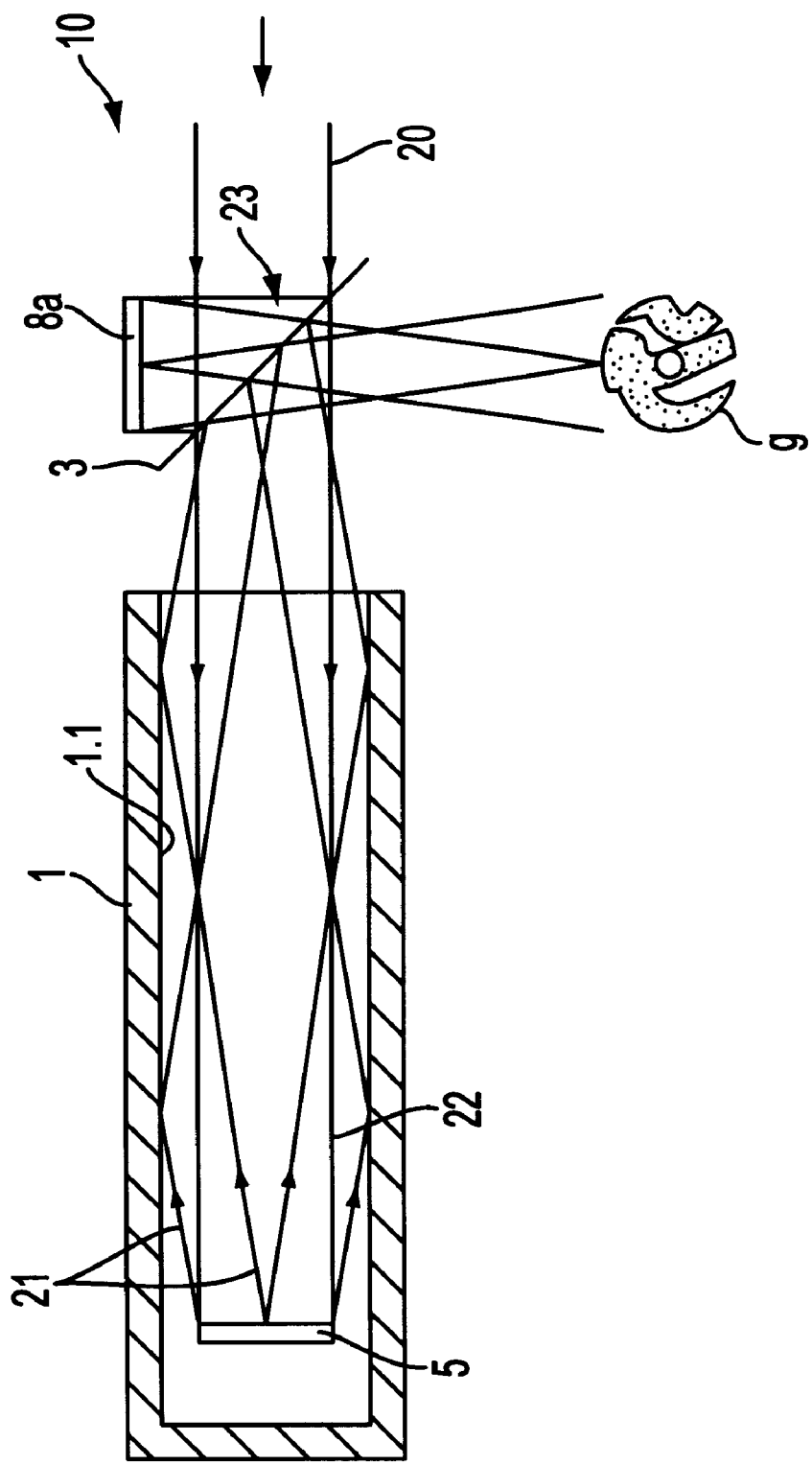

FIG. 2 shows an alternative design for the described additional exemplary embodiment. In FIGS. 1 and 2, the same parts are respectively provided with the same reference numbers. The mirror 4 shown in FIG. 1 is omitted. It is replaced by a second reflection hologram 8a. The transmission hologram 8 shown in FIG. 1 is omitted. The blocking device according to FIG. 1 with the half wave plate 7 and the polarizer 6 for suppressing the partial beam 22, which is reflected by the reflection hologram 5 in zero-order diffraction, can be provided for this embodiment as well. For both described embodiments where the reflected partial beam 22 must be suppressed, the blocking device can also be omitted by designing the first reflection hologram 5 with a predetermined blaze angle. That is why the blocking device with the half-wave plate 7 and the polarizer 6 are not shown in FIG. 2.

The above-described interferometric measuring arrangements 10 may be provided with a device for a phase shift interferometry or heterodyne interferometry for further, better analysis.

In the first embodiment, the transmission hologram 8 or reflection hologram 5 can be moved in a predetermined manner by a suitable motion device 24 or 26, respectively, so that the test results can be derived from the modulation of the phase difference of the two partial beams. With regard to the details of the phase shift interferometry and heterodyne interferometry, reference is made to the above-mentioned European and German references EP 491 749 and DE 43 17 064 A1, respectively, as well as to further literature references cited therein.

In the other embodiments, the mirror 4 or the second reflection hologram 8a can be shifted in the direction of the normal to the axis of the incident radiation 20 with a suitable motion frequency by a suitable motion device 28, or the incident radiation 20 can be provided with a frequency shift, for example, through actuation of a laser (not shown) emitting the incident radiation 20. The optical detour necessary in this process is formed by the two partial beams 21 and 23 having different lengths, so that no moving part is required for this technique.

With a relatively simple design, the above-described measures allow very precise measurements of surfaces, for example, also inside of blind holes.

It will be understood that the above description of the present invention is susceptible to various modifications, changes and adaptations, and the same are intended to be comprehended within the meaning and range of equivalents of the appended claims.

What is claimed is:

1. An interferometric measuring arrangement for the testing of a surface comprising: at least first and second synthetic holograms, with the first hologram being a reflection hologram; means for directing a beam of incident radiation onto the reflecting hologram to form at least two reflected partial beams with one of the two partial beams, after diffraction in and reflection by the reflecting hologram, being directed at the surface being tested, and with the other partial beam being a beam which is reflected at the reflection hologram with a zero-order diffraction; and, means for guiding the two reflected partial beams onto a point on a surface of the second hologram to cause, by the superimposition of the two partial beams at the surface of the second hologram, the formation of an interference pattern which carries information regarding the shape of the surface being tested.

2. A measuring arrangement according to claim 1, wherein said means for guiding includes a beam splitter arranged in a beam path for the beam of incident radiation forward of the reflection hologram, with the beam of incident radiation passing through the beam splitter onto the reflecting hologram in at least a partially linear manner, and with the two partial beams further being guided by the beam splitter onto the second hologram which is a transmission hologram.

3. A measuring arrangement according to claim 2, wherein: the refection hologram is oriented perpendicularly to the axis of the incident radiation beam; and the beam splitter is arranged such that the radiation reflected by the reflection hologram with zero-order diffraction is directed at a right angle at the transmission hologram which is laterally spaced from and parallel to the axis of the incident radiation beam.

4. A measuring arrangement according to claim 1, further comprising a motion device for moving the reflection hologram in a predetermined manner to permit the analysis of the interference pattern by at least one of phase shift interferometry and heterodyne interferometry.

5. An interferometric measuring arrangement for the testing of a surface comprising: at least first and second synthetic holograms, with the first hologram being a reflection hologram; a beam splitter which is arranged in a beam path of a beam of incident radiation forward of the reflection hologram, for splitting the incident light beam into first and second partial beams, with the first partial beam passing directly through the beam splitter unto the reflection hologram and, after diffraction in the reflection hologram, being reflected and, at least in part, being directed at the surface being tested and being guided in its further course onto a point on a surface of the second hologram, and with the second partial beam being directed by the beam splitter and a deflection arrangement onto the point on the surface of the second hologram without being directed at the surface being tested, to cause, by the superimposition of the two partial beams at the surface of the second hologram, the formation of an interference pattern which carries information regarding the shape of the surface being tested; and, means for preventing that portion of the first partial beam reflected at the reflecting hologram with a zero-order diffraction from impinging on the surface of the second hologram.

6. A measuring arrangement according to claim 5, wherein: the deflection arrangement is a mirror disposed adjacent the beam splitter and perpendicularly with respect to the axis of the incident light beam; the second hologram is transmission hologram and is disposed opposite the mirror on the other side of the beam splitter; and the means for preventing that portion of the first partial beam reflected at the reflecting hologram with a zero-order diffraction from impinging on the surface of the transmission hologram is a half-wave plate/polarizer device disposed in the beam path of the first partial beam between the reflecting hologram and the beam splitter.

7. A measuring arrangement according to claim 5, further comprising a motion device for moving the mirror in a predetermined manner in a direction of a normal to the mirror surface to permit analysis of the interference pattern by at least one of phase shift interferometry and heterodyne interferometry.

8. A measuring arrangement according to claim 5, wherein the incident radiation beam is provided with a predetermined frequency shift for the analysis of the interference pattern by one of phase shift interferometry and heterodyne interferometry.

9. An interferometric measuring arrangement for the testing of a surface comprising: at least first and second synthetic holograms, means for forming at least first and second partial light beams from an incident light beam, with the first partial beam being directed toward the surface to be tested following diffraction in the first hologram and during its further course being directed toward a point on the second hologram at which the second partial beam, which is not directed toward the surface to be tested, also impinges and where an interference pattern formed through this superimposition of the two partial beams carries the information regarding the shape of the surface; and wherein: the first hologram is a reflection hologram, the means for forming includes a beam splitter which is arranged in the incident light beam path forward of the first reflection hologram, and through which a first portion of the incident light, constituting the first partial beam, travels to the first hologram, and which directs a further portion of the incident light beam, which further portion is different from the first portion and constitutes the second partial beam, to the second hologram, which likewise is a reflection hologram; and means are provided for preventing a portion of the first partial beam reflected at the first reflection hologram with a zero-order diffraction from impinging on the second reflection hologram.

10. A measuring arrangement according to claim 9, wherein the means for preventing comprises a predetermined blaze angle for the first reflection hologram.

11. A measuring arrangement according to claim 9, wherein the incident radiation beam is provided with a predetermined frequency shift for the analysis of the interference pattern by one of phase shift interferometry and heterodyne interferometry.

* * * * *